United States Patent
Husney

(10) Patent No.: US 8,462,707 B2
(45) Date of Patent: Jun. 11, 2013

(54) JOINING A MESH NETWORK IN A MULTIPLE NETWORK ENVIRONMENT

(75) Inventor: Jordan Husney, Minneapolis, MN (US)

(73) Assignee: Digi International Inc., Minnetonka, MN (US)

(*) Notice: Subject to any disclaimer, the term of this patent is extended or adjusted under 35 U.S.C. 154(b) by 0 days.

(21) Appl. No.: 12/243,727

(22) Filed: Oct. 1, 2008

(65) Prior Publication Data

US 2010/0080146 A1    Apr. 1, 2010

(51) Int. Cl.
*H04W 4/00* (2009.01)

(52) U.S. Cl.
USPC ............... 370/329; 370/338; 370/341

(58) Field of Classification Search
None
See application file for complete search history.

(56) References Cited

U.S. PATENT DOCUMENTS

| | | | |
|---|---|---|---|
| 2007/0038743 A1* | 2/2007 | Hellhake et al. | 709/224 |
| 2007/0174382 A1* | 7/2007 | Chung et al. | 709/200 |
| 2007/0189247 A1* | 8/2007 | Wang et al. | 370/338 |
| 2007/0250713 A1* | 10/2007 | Rahman et al. | 713/171 |
| 2008/0068156 A1 | 3/2008 | Shimokawa et al. | |
| 2008/0112363 A1* | 5/2008 | Rahman et al. | 370/331 |
| 2009/0135843 A1* | 5/2009 | Veillette | 370/406 |
| 2009/0296703 A1* | 12/2009 | Peng | 370/389 |
| 2010/0135186 A1* | 6/2010 | Choong et al. | 370/253 |

OTHER PUBLICATIONS

European Application Serial No. 09172014.4, European Search Report mailed Feb. 23, 2010, 7 pgs.
"ZigBee Alliance, ZigBee Specification Document 053474r06, Version 1.0", Online. [retrieved Jun. 30, 2006]. Retrieved from the Internet: <URL:http://www.nd.edu/~mhaenggi/ee67011/zigbee.pdf>, (Dec. 14, 2004), 232 pgs.
European Application Serial No. 09172014.4, Examiner Notification mailed Oct. 27, 2010, 1 Pg.
European Application Serial No. 09172014.4, Response filed Feb. 22, 2011 to Office Action dated Oct. 27, 2010, 14 pgs.
European Patent Office, "Office Action", "from Foreign Counterpart of U.S. Appl. No. 12/243,727", Mar. 22, 2013, pp. 13, Published in: EP.

* cited by examiner

*Primary Examiner* — Chi Pham
*Assistant Examiner* — Soon-Dong D Hyun
(74) *Attorney, Agent, or Firm* — Fogg & Powers LLC

(57) ABSTRACT

Wireless mesh network nodes in a mesh network are operable to join a desired wireless mesh network in a multi-network environment. The nodes search for a compatible mesh network, find a compatible mesh network, join the found compatible mesh network, indicate whether the joined mesh network is the desired mesh network, and receive input causing the network node to withdraw from the joined mesh network and search for other mesh networks to join if desired network has not been joined.

16 Claims, 2 Drawing Sheets

JOINING A MESH NETWORK IN A MULTIPLE NETWORK ENVIRONMENT

FIELD OF THE INVENTION

The invention relates generally to mesh networks, and more specifically in one embodiment to joining a desired wireless mesh network in a multiple wireless mesh network environment.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join the network.

But, joining a mesh network becomes somewhat more complex in network environments where different frequencies or network identifiers are used. In ZigBee mesh networks, for example, different frequencies or channels can be used for different networks, such as to prevent nodes from one network from interfering with another network. A new node wishing to join a network must therefore find the appropriate frequency or channel being used by the intended network before it can join the intended network. This is performed in one example by searching among the various available channels until a mesh network is found, but confirming that the node has joined the intended network is difficult.

In addition to searching various frequencies or channels, some wireless mesh network technologies also use a network identifier, such as the PAN ID used in ZigBee networks. If a device receives data on a given channel but the data does not contain an identifier that matches the PAN ID of the network that has been joined, the data will be discarded as belonging to another mesh network. In ZigBee, node devices can be set to search for a particular PAN ID and join only that network, or can search for any available network and inherit the PAN ID of a network once it is found.

In environments where only one mesh network is present, new nodes will be able to quickly find and join the network. But, if multiple wireless mesh networks are present, it is difficult to ensure that a new node has joined the desired network. There exists a need to provide wireless mesh network technology that addresses joining an intended network in a network environment with multiple mesh networks.

SUMMARY

Various example embodiments of the invention comprise network nodes and methods of joining network nodes to a desired wireless mesh network in a multi-network environment. The nodes search for a compatible mesh network, find a compatible mesh network, join the found compatible mesh network, indicate whether the joined mesh network is the desired mesh network, and receive input causing the network node to withdraw from the joined mesh network and search for other mesh networks to join if desired network has not been joined.

DETAILED DESCRIPTION

Figure 1:
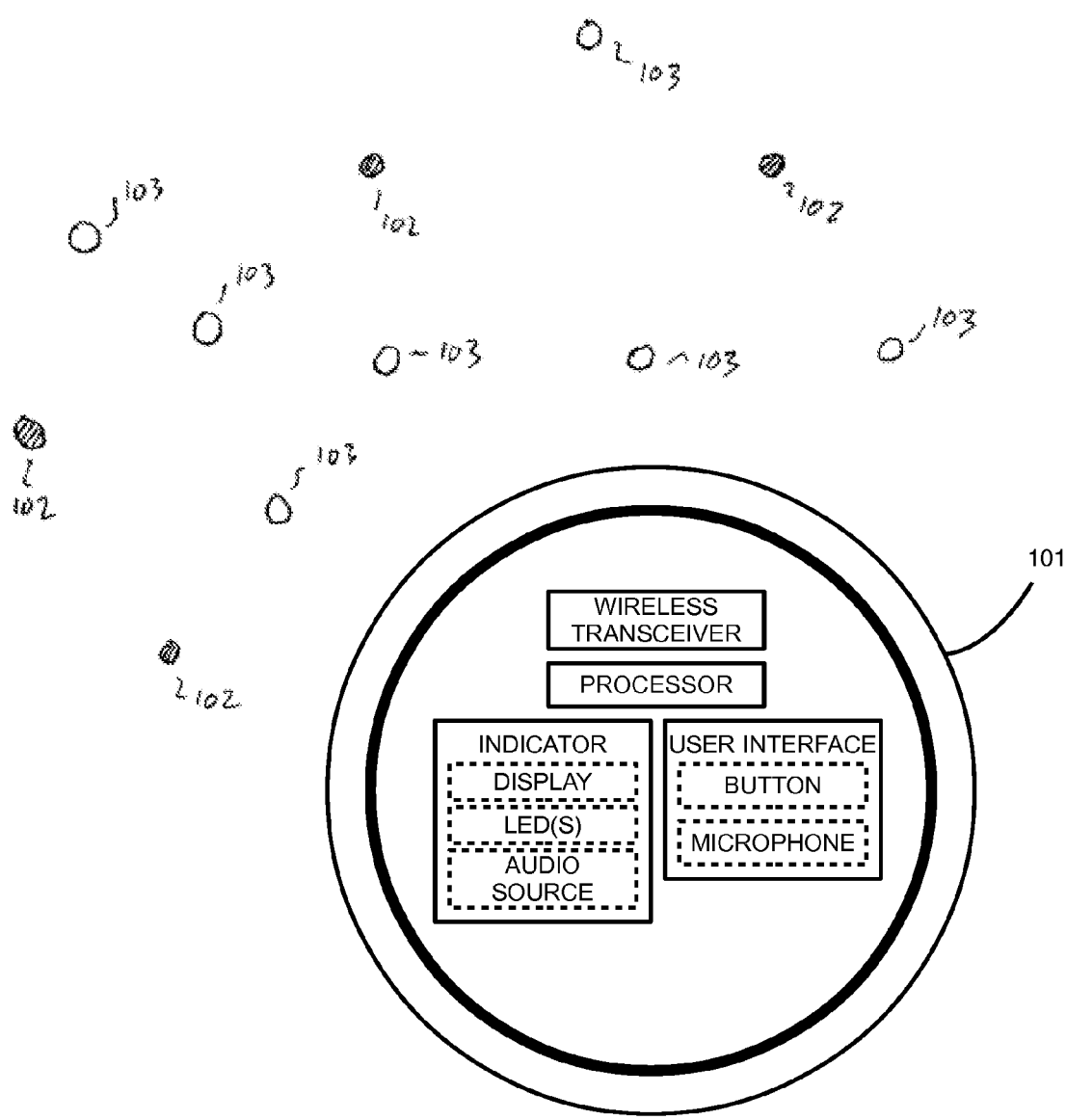
FIG. 1 shows an example wireless mesh network environment having multiple mesh networks, as may be used to practice some embodiments of the invention.
Figure 2:
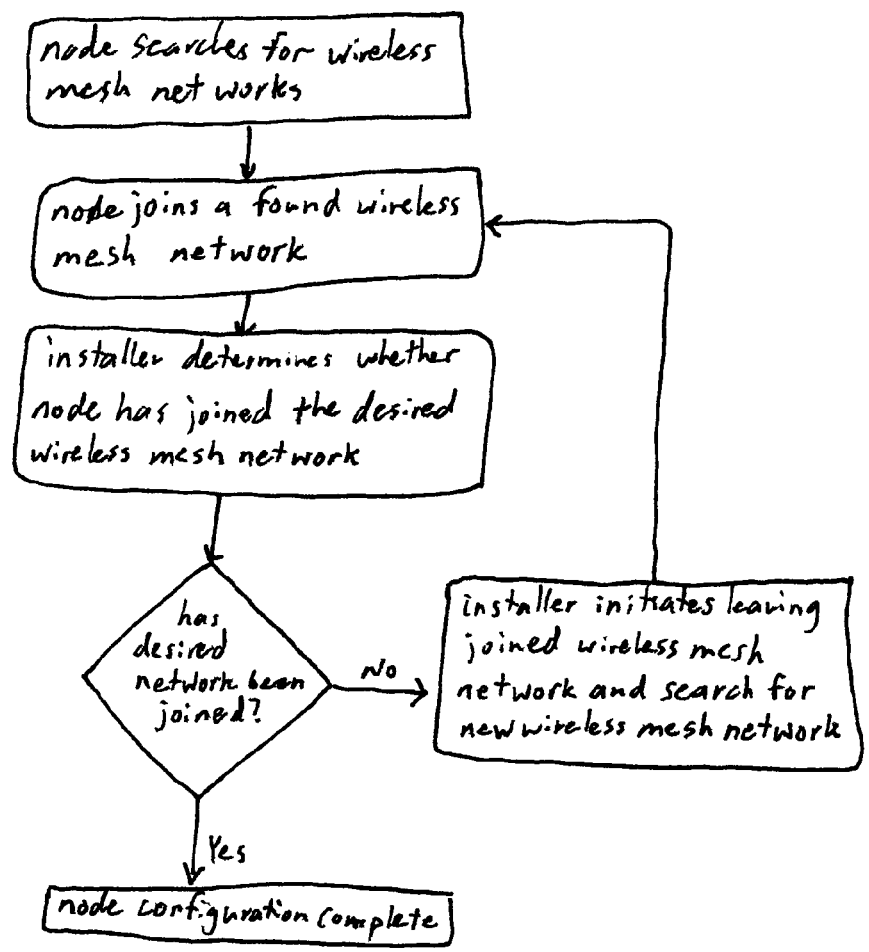
FIG. 2 is a flowchart illustrating a method of joining a desired wireless mesh network in a multi-network environment, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Mesh networks are often used to route data between various elements or nodes in a network made up of a number of loosely assembled nodes. Many mesh networks are designed such that a compatible node can easily join the network and receive and send data, including passing received data long a route to an intended destination node. Mesh networks are therefore often self-healing, in that if a node becomes inoperable or loses a connection to another node, data can be easily routed around the broken network link.

Many mesh network technologies use wireless communication, further enhancing the ease of use of mesh networking for certain applications. Because mesh network nodes are typically stationary, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network.

One example of a mesh network standard using wireless radio communication is the ZigBee mesh network, which was developed by an industry alliance and is related to IEEE standards including 802.15.4. The retail price of ZigBee-compliant transceivers is nearly a dollar, and a transceiver, memory, and processor can be bought for a few dollars in quantity, making integration of mesh network technology into inexpensive electronic devices economically practical. The standard is intended to support low power consumption at reasonably low data rates, and provides a self-organizing network technology that works well for applications such as control, monitoring, sensing, and home automation.

In this example of wireless mesh technology, one node operates as a coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

New nodes are able to join an existing network by searching known radio channels on which the mesh network technology operates, and in further examples by looking for other mesh network nodes broadcasting data having a PAN ID that matches the PAN ID of the network that the new node wishes to join. In an alternate embodiment, the PAN ID of a found network is adopted by the new node, which will not route data with other nodes having different PAN IDs once the network has been joined, even if on the same radio frequency channel.

But, effective mesh networking in wireless environments such as ZigBee becomes more difficult if multiple mesh networks are present. Past solutions include manually setting the desired channel and PAN ID of the intended network on each node so that the node searches for and joins only the intended network, but such solutions typically require that the network administrator uses a configuration tool to pre-configure each network node with information regarding the intended network.

Some embodiments of the invention seek to address this problem by providing a method for a network node to join a desired wireless mesh network in a multi-network environment, where the node searches for, finds, and joins a compatible mesh network, indicates whether the joined mesh network is the desired mesh network, and receives input causing the network node to withdraw from the joined mesh network and search for other mesh networks to join if desired network has not been joined.

FIG. 1 shows an example mesh network environment having multiple mesh networks, consistent with an example embodiment of the invention. A new mesh network node 101 is being introduced into the mesh network environment, which here includes a first mesh network identified by nodes marked 102, and a second mesh network identified by nodes marked 103. Multiple mesh networks in the same physical environment are commonly found in environments such as where the mesh network nodes are security devices, sensors, industrial or process monitoring devices, and in other applications.

Here, the new mesh network node 101 wishes to join the first mesh network 102, and not the second mesh network 103. Traditionally, this would require identification of configuration information for mesh network 102, such as radio frequency channel, network ID, and other such information. This data would be pre-configured into the new node 101 such as by use of a configuration device or a link to a computer running configuration software to load the configuration information into the node 101.

Some embodiments of the invention provide a more efficient, self-sufficient way for the new mesh network node 101 to join a specific network, including the ability to join one of a number of mesh networks in a given environment, and to then leave the joined network if the joined network is not the desired mesh network and to join a different mesh network. This process is repeated until the desired mesh network is joined, resulting in joining a desired mesh network without requiring the use of an external configuration tool such as a computer.

To start, the installer powers on the wireless mesh network node 101, and the node searches for an available wireless mesh network at 201, and joins a found wireless mesh network at 202. The installer in some embodiments discovers whether the mesh network node 101 has joined the desired network at 203, such as by observing a network radio frequency channel identifier or another network identifier on the node 101. The identifier is in some embodiments displayed on a numeric or alphanumeric display, is displayed as a series of flashes of a LED or other light, is presented as a series of beeps, or is conveyed in another way.

Once the installer is able to determine which network has been joined, he can determine whether the joined network is the desired network at 203. If the desired network has been joined at 204, no further configuration is necessary. If the desired network has not been joined at 204, the installer indicates this to the node such as by pushing a button on the network node, and the node leaves the joined network at 205 and searches for another wireless mesh network in the environment at 206.

This process repeats until the new wireless mesh network node has joined the desired wireless mesh network. In alternate embodiments, the installer uses other methods to cause the mesh network node to leave its current wireless mesh network and search for other wireless mesh networks, such as using an audible action, a software command, or any other type of action. The installer can therefore bring a new wireless mesh network device into a network environment and install the device with no external tools needed, even in complex multiple network environments.

The installer is not required to keep a list of configuration information for the various networks in a facility or environment, or to use a complex configuration tool to preconfigure network parameters into the new wireless mesh network node. The installer is able to execute a simple action repeatedly until the new network node joins the desired network, causing the mew mesh network node to continue discovering wireless mesh networks until the desired wireless mesh network is joined or until all networks in the environment have been found.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A method of a network node joining a desired wireless mesh network in a multi-network environment, comprising:
searching for a compatible mesh network;
finding a compatible mesh network;
joining the found compatible mesh network without user intervention upon finding a compatible mesh network;
indicating whether the joined mesh network is the desired mesh network; and
receiving input causing the network node to withdraw from the joined mesh network and search for other mesh networks to join if desired network has not been joined.

2. The method of claim 1, wherein indicating whether the joined mesh network is the desired mesh network comprises indicating a network identifier to an installer, and wherein the installer provides the input causing the network node to withdraw from the joined mesh network and search for other mesh networks to join if desired network has not been joined.

3. The method of claim 2, wherein the network identifier comprises at least one of a radio frequency channel and a network identifier.

4. The method of claim 1, wherein search for other mesh networks to join if desired network has not been joined comprises at least one of searching other radio frequency channels and searching for other network identifiers.

5. The method of claim 1, wherein receiving input causing the network node to withdraw from the joined mesh network and search for other mesh networks to join if desired network has not been joined comprises at least one of receiving input via a switch, a computer interface, or a software command.

6. The method of claim 1, wherein joining the found compatible mesh network comprises sending a message via the joined wireless mesh network to a coordinating node.

7. A method of a network node joining a desired wireless mesh network in a multi-network environment, comprising:
searching for a compatible mesh network;
finding a compatible mesh network;
joining the found compatible mesh network without user intervention upon finding a compatible mesh network;
determining whether the joined mesh network is the desired mesh network; and
withdrawing from the joined mesh network and searching for another mesh network to join if desired network has not been joined.

8. The method of claim 7, wherein determining whether the joined mesh network is the desired mesh network comprises determining whether at least one of a desired network node radio frequency channel and a network identifier matches the radio frequency channel and network identifier of the desired wireless mesh network.

9. A method of a network node joining a desired wireless mesh network in a multi-network environment, comprising:
searching for a compatible mesh network;
finding the compatible mesh network;
joining the found compatible mesh network without user intervention upon finding a compatible mesh network;
determining whether the joined mesh network is the desired mesh network;
receiving an indication if the joined mesh network is not the desired mesh network; and
upon receiving an indication that the joined mesh network is not the desired mesh network, automatically withdrawing from the joined mesh network and searching for and joining another mesh network.

10. The method of claim 9, wherein determining whether the joined mesh network is the desired mesh network includes displaying a network identifier to an installer, wherein the network identifier identifies the mesh network the node has joined; and
wherein receiving an indication that the joined mesh network is not the desired mesh network includes receiving, from the installer, a signal indicating that the joined mesh network is not the desired mesh network.

11. A wireless mesh node, comprising:
a wireless transceiver;
a processor;
a joined network indicator connected to the processor; and
a user interface connected to the processor;
wherein the processor searches for and joins a compatible mesh network;
wherein the joined network indicator is configured to identify to a user the mesh network that has been joined;
wherein the user interface is operable by a user to indicate that the joined mesh network is not the desired mesh network; and
wherein, when the user interface indicates that the joined mesh network is not the desired mesh network, the processor searches for and joins another compatible mesh network.

12. The wireless mesh node of claim 11, wherein the joined network indicator is a display.

13. The wireless mesh node of claim 11, wherein the joined network indicator is one or more light emitting diodes (LEDs).

14. The wireless mesh node of claim 11, wherein the joined network indicator includes an audio source.

15. The wireless mesh node of claim 11, wherein the user interface is a button.

16. The wireless mesh node of claim 11, wherein the user interface is a microphone and wherein the user provides an audible action to indicate that the joined mesh network is not the desired mesh network.

* * * * *